United States Patent [19]

Pillai

[11] Patent Number: 5,759,510
[45] Date of Patent: Jun. 2, 1998

[54] LITHIATED MANGANESE OXIDE

[75] Inventor: G. Chithambarathanu Pillai, Peru, Ill.

[73] Assignee: Carus Chemical Company, LaSalle, Ill.

[21] Appl. No.: 726,323

[22] Filed: Oct. 3, 1996

[51] Int. Cl.$^6$ ............................................. C01G 45/12
[52] U.S. Cl. .................................................... 423/599
[58] Field of Search .......................................... 423/599

[56] References Cited

U.S. PATENT DOCUMENTS

| | | | |
|---|---|---|---|
| 4,246,253 | 1/1981 | Hunter | 423/605 |
| 4,312,930 | 1/1982 | Hunter | 429/191 |
| 4,590,059 | 5/1986 | Mellors | 423/605 |
| 4,975,346 | 12/1990 | Lecerf et al. | 429/197 |
| 5,135,732 | 8/1992 | Barboux et al. | 423/593 |
| 5,604,057 | 2/1997 | Nazri | 423/605 |

FOREIGN PATENT DOCUMENTS

| | | | |
|---|---|---|---|
| 0279235 | 8/1988 | European Pat. Off. . | |
| 2221213 | 1/1990 | United Kingdom | 423/599 |

OTHER PUBLICATIONS

Gummow, R.J. et al, "Improved capacity retention . . . ," Solid State Ionics, 69 (1994), pp. 1–10, no month.

Abraham, et al., "Lithiated Manganese Oxide Cathodes for Rechargeable Lithium Batteries", IEEE, (1996), pp. 317–323, no month.

Bach, et al., Sol–Gel Synthesis of Manganese Oxides, Journal of Solid State Chemistry, 88, pp. 325–333, (1990).

Bach, et al., "Synthesis and Characterization of Lamellar $MnO_2$ Obtained from Thermal Decomposition of $NaMnO_4$ for Rechargeable Lithium Cells", Journal of Solid State Chemistry, 120, pp. 70–73 (1995), no month.

Furukawa, et al., "Manganese Oxides for Lithium Secondary Battery", Proc. Electrochem. Soc., 88–6, pp. 557–564, (1988), no month.

Kelder, et al., "Bulk Syntheses and Electrochemical Properties of Submicron Powders of $Li_xMn_2O_4$, pp. 114–117, no date, no journal.

Li, et al., "Secondary Li Cells", Solid State Ionics 47 (1991), pp. 231–240, no month.

Li, et al., "Lithium Intercalation from Aqueous Solutions", J. Electrochem. Soc., vol. 141, No. 9, Sep. 1994, pp. 2310–2316.

Manev, et al., "Synthesis of $LiMn_2O_4$ for Rechargeable Lithium–Ion Battery", Log Batteries, Battery Mater., vol. 14, (1995), pp. 101–124, no month.

Momchilov, et al., "Recharageable Lithium Battery with Spinel–Related $MnO_2$", Journal of Power Sources, 41 (1993) pp. 305–314, no month.

Nohma, et al., "Li/$MnO_2$ (CDMO) Recharable Batteries", Proc. Electrochem. Soc., 91–3, pp. 311–317 (1991), no month.

Nohma, et al., "Commercial Cells Based on $MnO_2$–Related Cathodes", Chapter 11, Ind. Chem. Libr. 5(Lithium Batteries) pp. 417–456, (1994), no month.

Pereira–Ramos, j.kP., "Electrochemical Properties of Cathodic Materials Synthesized by Low–Temperature Techniques", Journal of Power Sources, 54 (1995) pp. 120–126, no month.

Pistoia, et al., Synthesis of Mn Spinels from Different Polymorphs of $MnO_2$, Journal of Power Sources, 56 (1995) pp. 37–43, no month.

Rossouw, et al., "Alpha Manganese Dioxide for Lithium Batteries: A Structural and Electrochemical Study", Matt. Res. Bull., vol. 27, pp. 221–230, (1992), no month.

Tarascon, et al., "Synthesis Conditions and Oxygen Stoichiometry Effects on Li insertion into the Spinel $LiMn_2O_4$", J. Electrochem. Soc., vol. 141, No. 6, Jun., 1994, pp. 1421–1431.

Thackaeray, M.M., "Develoments in Li–Mn–O Electrode Technology for Rechargeable Lithium Batteries", Progress in Batteries & Battery Materials, vol. 11 (1992) IBA Sydney (Australia) Meeting, pp. 150–157, no month.

Thackeray, et al., "Ramsdellite–$MnO_2$ for Lithium Batteries: The Ramsdellite to Spinel Transformation", Electrochimica Acta, vol. 38, No. 9, pp. 1259–1267, (1993), no month.

Zachau–Christiansen, et al., "Insertion of lithium into the Manganese Dioxides: Pyrolusite and Ramsdellite", Solid State Ionics 70/71 (1994) pp. 401–406, no month.

*Primary Examiner*—Steven Bos
*Attorney, Agent, or Firm*—Fitch, Even, Tabin & Flannery

[57] ABSTRACT

The invention is directed to making a lithiated manganese dioxide using low and high temperature calcination steps.

28 Claims, 1 Drawing Sheet

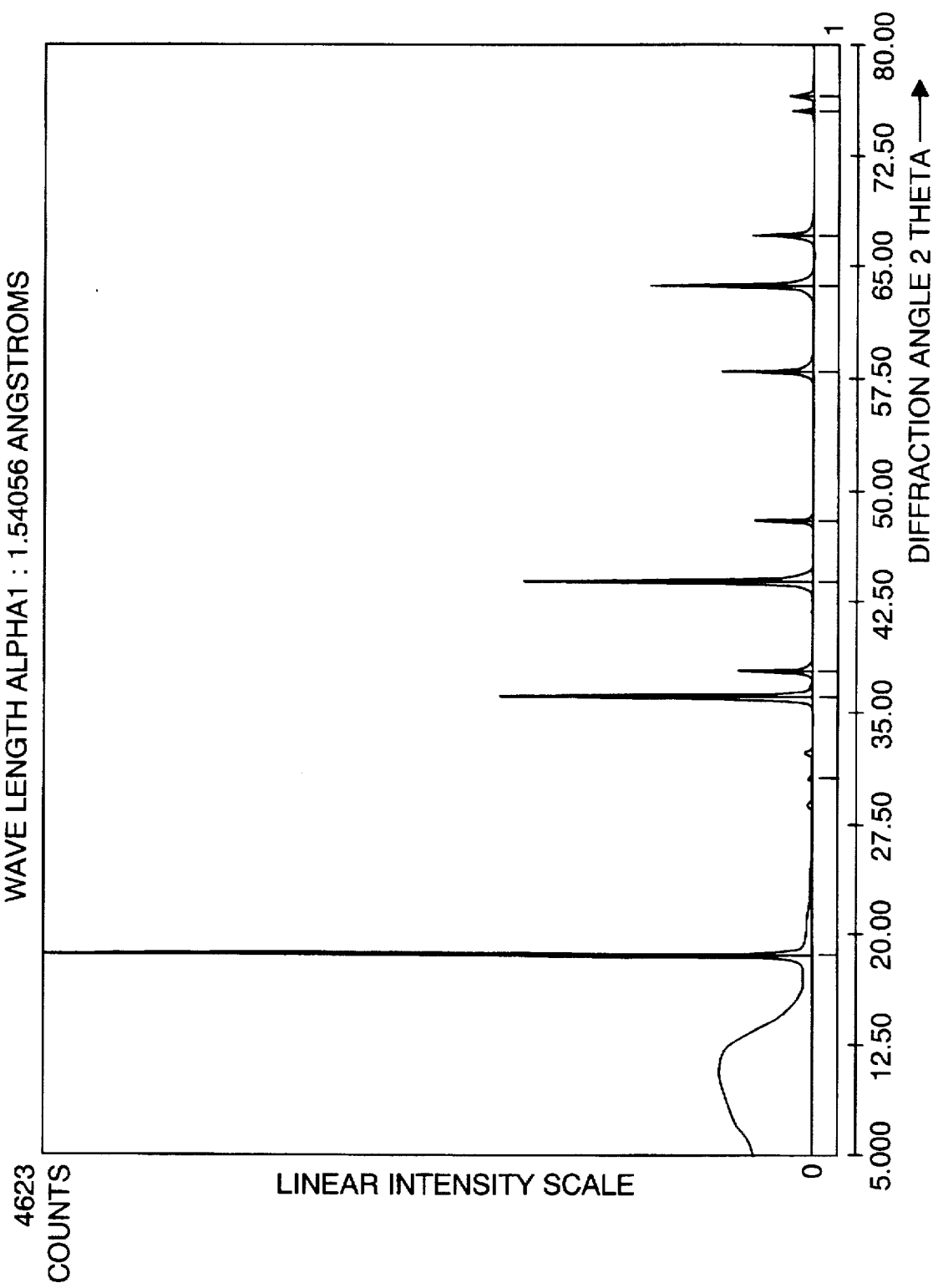

LITHIATED MANGANESE OXIDE

FIELD OF THE INVENTION

This invention relates to a method of making lithiated manganese oxide which is particularly useful in the manufacture of lithium/manganese batteries.

More particularly, this invention is directed to making $LiMn_2O_4$ from an amorphous manganese dioxide where the $LiMn_2O_4$ has an x-ray pattern recognized as particularly useful in the manufacture of batteries.

BACKGROUND OF THE INVENTION

Manganese dioxide is a known material for use as a cathodic material in batteries. It also is known that it is not suitable for rechargeable batteries. Apparently irreversible structural changes occur in manganese dioxide during discharge which do not permit recharging.

Lithiated manganese oxide made from $MnO_2$ has been investigated for use in rechargeable batteries. The method of making the lithiated manganese oxide and the manganese dioxide starting material appears to materially affect the effectiveness of the lithiated manganese oxide used in rechargeable batteries. U.S. Pat. Nos. 4,312,930 and 4,246,253 to Hunter describes a lithiated manganese oxide which Hunter says has a particularly effective utility for rechargeable batteries. Each of these Hunter patents is incorporated herein as if fully rewritten.

An object of this invention is to provide a process for making lithiated manganese oxide.

Another object of this invention is to use chemically made manganese dioxide in making the lithiated manganese oxide by the process of the invention.

Yet another object of this invention is to make a pure form of lithiated manganese oxide from the reduction of an alkali metal permanganate such that the lithiated manganese oxide has a utility that is particularly effective for a cathodic material for rechargeable batteries.

Further objects and advantages of the invention will be found by reference to the following specification.

As used herein, $LiMn_2O_4$ means a lithiated manganese oxide with the general formula $Li_xMn_2O_4$ where x is greater than 0, less than about 2 and, in an important aspect is about 1.

As used herein, "amorphous manganese dioxide" means a manganese dioxide which does not have a substantially identifiable crystal structure as determined by x-ray diffractometry.

As used herein, "delta manganese dioxide" means a manganese dioxide which does not have a single crystal structure which dominates to provide a manganese dioxide with at least one identifiable crystal structure. Delta manganese dioxide is often described as having the following general formula $M_2O \cdot 4MnO_2$ where M is an alkali metal cation.

As used herein, "reducing permanganate" means taking manganese (VII) to manganese (III or IV).

As used herein, "substantially all Mn IV" means at least about 90 weight percent Mn IV and not more than about 10 weight percent Mn III.

SUMMARY OF THE INVENTION

The invention provides a method of making $LiMn_2O_4$ from amorphous manganese dioxide which $LiMn_2O_4$ is particularly useful as cathodic material for rechargeable batteries. The invention provides for blending an amorphous $MnO_2$ with a lithium compound, such as LiOH, to provide a lithium/manganese blend. The lithium/manganese blend first is calcined at a temperature range of from about 150° to about 550° C. for about 2 to about 72 hours to provide an initially calcined lithium/manganese complex. The molar ratio of lithium to manganese in the initially calcined complex is adjusted to about one lithium atom to two manganese atoms to provide a stoichiometric lithium/manganese complex. This is uniquely done by exposing the initially calcined lithium/manganese complex to an aqueous environment which includes aqueous lithium and adjusting the pH of the environment to about 6.0 to about 6.5. This generally will be effective for providing one lithium atom for about every two manganese atoms in the initially calcined complex. The stoichiometric lithium/manganese complex is calcined at a temperature range of from about 500° to about 900° C. for a time effective for providing lithiated manganese oxide having the formula $LiMn_2O_4$. The second calcination is done at a time and temperature effective for providing the lithiated manganese oxide with the capability of providing an electromotive force of from about 3 to about 4 volts in a circuit without load when the lithiated manganese dioxide is used as a cathodic material in a battery.

The invention is particularly useful in that it permits the utilization of a chemically made form of $MnO_2$ as a starting material. In this aspect the $MnO_2$ is made from the reduction of permanganate or manganate by an organic compound. In an important aspect of the invention the starting manganese dioxide results from the reduction of permanganate [Mn (VII)] to a manganese dioxide which is substantially all (at least 90 weight percent) manganese IV, although the manganese dioxide starting material may include some manganese III.

In an important aspect of the invention, the permanganate reduction reaction is the reaction of an alkali metal permanganate such as $KMnO_4$ or $NaMnO_4$ with an organic reducing agent such as a compound containing side chain methyl groups. These compounds include fumaric acid, propanol, glucose, toluene sulphonamide, picoline, methyl substituted pyridines, dimethyl substituted pyridines and alkene compounds which reduce the permanganate. In this aspect the permanganate reduction is under alkaline conditions which means that it is conducted at a pH of above about 7 and preferably above about 10. The most common forms of permanganate are potassium and sodium permanganate with potassium permanganate being more common than sodium permanganate. The latter permanganates are commonly used as oxidizers, and as oxidizers, are reduced in an oxidation/reduction reaction which commonly produces $MnO_2$ as a by-product. The invention advantageously uses this by-product.

In an important aspect, the method of the invention also involves the use of the $MnO_2$ from a alkali metal permanganate or manganate oxidation/reduction reaction with the advantageous removal of alkali metals, such as potassium and sodium ions, in the process of the invention. In this aspect of the invention, the permanganate or manganate is an alkali metal permanganate or manganate such as potassium or sodium permanganate. The initially calcined lithium/manganese complex made from the alkali metal permanganate or manganate is washed in an aqueous medium to remove alkali metal manganate impurities where the aqueous medium comprises lithium ion such as from aqueous LiOH. This washing precludes the addition of deleterious ions to the lithium/manganese complex and removes sodium and potassium contaminants which often are in the form of $M_2MnO_4$ or $M_3MnO_4$ (where M is potassium or sodium). $M_2MnO_4$ or $M_3MnO_4$ are stable in a LiOH/water medium at a pH of from about 11 to about 13 or more so that they solubilize and wash from the lithium/manganese dioxide complex. Thereafter the washed initially calcined complex is washed in an acidic aqueous medium at a pH of from about 6.0 to about 6.5 to control the stoichiometry of the final product such that $Li_xMn_2O_4$ has x greater than 0 but less than about 2. In an important aspect the pH is controlled so that x is about 1. This permits the production of the lithiated manganese oxide which is free from potassium and sodium which would ultimately have a deleterious effect on the use of the lithiated manganese compound in batteries.

In another important aspect of the invention, the lithiated compound of the invention exhibits an x-ray diffraction pattern as described herein and as shown in FIG. 1.

DESCRIPTION OF THE PREFERRED EMBODIMENTS

The invention provides a method of making $LiMn_2O_4$ from amorphous manganese dioxide. The method of the invention provides $LiMn_2O_4$ which is particularly useful as cathodic material for rechargeable batteries. The invention permits the use of an amorphous $MnO_2$ which is a by-product of an oxidation/reduction reaction where a permanganate or manganate salt, particularly an alkali metal permanganate or manganate, is reduced during an oxidation of an organic compound by the permanganate or manganate salt. The oxidation/ reduction reaction is conducted at a pH of at least 7, but in an important aspect is conducted at a pH above about 10. The manganese dioxide that results from the oxidation/reduction reaction is amorphous and may be characterized as delta manganese dioxide. The organic compound reduces permanganate or the manganate such that the resulting manganese dioxide is substantially all manganese IV (at least about 90 weight percent manganese IV). Not more than about 10 weight percent of the resulting manganese dioxide is manganese III.

The organic compound which may be used in the oxidation/reduction reaction may be an organic compound having side chain lower alkyl groups (side chains having one to four carbon atoms, such as methyl, ethyl, propyl and butyl groups). Such compounds include alkyl substituted pyridines and dialkyl substituted pyridines having the general formula

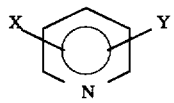

where at least one of x and y are methyl, ethyl, propyl and butyl, but one x or y may be H. Other organic compounds which may be used to reduce the permanganate or manganate include fumaric acid, propanol, glucose, toluene sulphonamide, picoline and the compounds listed below in Table I. Table I illustrates the pH of the dependency of the oxidation/reduction reaction.

Table I

Organic Compounds which Reduce Aqueous Permanganate as reported in the Chemical Literature*

| COMPOUND | pH 7 | pH 10 |
|---|---|---|
| Propanal | Reaction | Reaction |
| Propylamine | No reaction | Reaction |
| Ethyl formate | No reaction | Reaction |
| Alanine | No reaction | Reaction |
| Pyruvic acid | Reaction | Reaction |
| Acrolein | Reaction | Reaction |
| Allylamine | Reaction | Reaction |
| Acrylic acid | Reaction | Reaction |
| Allyl alcohol | Reaction | Reaction |
| Benzaldehyde | Reaction | Reaction |
| Phenol | Reaction | Reaction |
| Aniline | Reaction | Reaction |
| Benzyl alcohol | Reaction | Reaction |
| 2-Butanone | No reaction | Reaction |

*[Organic compound] = 50 mg/L.
[$KMnO_4$] = 32 mg/L.
Consumption of 10 mg/L of $KmnO_4$ in 6 hours is an indication that a reaction had taken place.

The amorphous manganese dioxide from the oxidation/reduction reaction is blended with a lithium compound such as LiOH, to provide a lithium/manganese blend. The blend should comprise from about 1.6 to about 3.0 moles of the lithium compound for every mole of manganese dioxide. Other lithium compounds which may be used in the first calcination include lithium oxide, lithium carbonate and lithium nitrate. In an important aspect about one mole of manganese dioxide is blended with about three moles of lithium hydroxide.

The lithium/manganese blend first is calcined at a time and temperature effective for providing lithium in an initially calcined manganese complex where the complex does not have more than about 10 weight percent of material in a "rock salt phase" which has the formula $Li_2MnO_3$. The "rock salt phase" will be formed if the temperature is too high. If the temperature is too low, the alkali present in the blend will not be converted into manganates and the alkali will not be removed in subsequent washing steps. Moreover, the initially calcined product, which after washing as described herein, will not provide the spinel end product after the second calcination. Generally the time and temperature for the first calcination is in the range of from about 150° to about 550° C. for about 2 to about 72 hours to provide an initially calcined lithium/manganese complex. In an important aspect, the first calcination is done at from about 400° to about 500° C. for about 10 to about 30 hours.

After the first calcination, the initially calcined complex is washed with a 2% lithium hydroxide solution. In the wash, about three parts 2% lithium hydroxide solution is mixed with about one part initially calcined complex to form a slurry. The liquid is decanted from the solid. The slurrying and decanting is repeated once more with LiOH solution and finally with water. The washed and decanted cake is filtered. The filtered wet cake is then resuspended by mixing with about three parts of water to form a slurry, such that the slurry has a pH in the range of about 11 to about 13. Thereafter, the pH of the slurry is brought down to about 6.0 to about 6.5, and preferably to about 6.1 to about 6.2 to provide a stoichiometric lithium/manganese complex. This is an important aspect of the invention. Acids which may be used to lower the pH of the water/initially calcined complex slurry include sulfuric acid, nitric acid, hydrochloric acid and hydrofluoric acid. The lithium hydroxide wash is important because it removes alkali metal manganates from the initially calcined complex. These manganates are stable at an alkaline pH, are solubilized in the wash step, and are removed from the initially calcined complex by filtering, decanting or other means of separating the complex from the aqueous medium. The pH adjustment is important because the pH controls the ratio of lithium and manganese in the ultimate product, $Li_xMn_2O_4$. If the pH is too low, or below about 6.0, the final product may be contaminated with lower valent oxides, such as $Mn_2O_3$. If the pH is too high, or above about 6.5, the final product may be contaminated with $Li_2MnO_3$.

After the initially calcined lithium/manganese complex has been washed and pH adjusted with acid to provide the stoichiometric complex, the stoichiometric complex is calcined at generally a higher temperature to provide the final stoichiometric lithium/manganese complex or lithiated manganese dioxide. This calcination is done for a time and temperature to provide a final lithium/manganese complex which will have a general formula $Li_xMn_2O_4$ where x is greater than 0, but less than about 2. In an important aspect, this calcination will provide a product where x is about 1. In another important aspect, this calcination will provide an electromotive force of from about 3 to about 4 volts without load when it is used as a cathodic material in a battery. In an important aspect, the stoichiometric calcination is at a temperature of from about 500° to about 900° C. from about 2 to about 72 hours and preferably from about 750° to about 850° C. for about 10 to about 30 hours.

The following examples set forth how to practice the invention.

EXAMPLE 1

A. The permanganate reduction reaction to make amorphous $MnO_2$:

1 mole of fumaric acid, 3 moles of potassium hydroxide, 20 moles of water and 3.6 moles of potassium permanganate are mixed, heated to about 70° C.–80° C. and reacted in a reduction reaction of the permanganate to provide hydrous manganese dioxide. The resulting manganese dioxide is amorphous and is without a specific crystal structure.

B. The conversion of the $MnO_2$ of example 1(A) to lithiated manganese dioxide:

The manganese dioxide of example 1(A) (1 part) and 0.68 parts of $LiOH \cdot H_2O$ are blended and then calcined at about 450° C. for about 16 hours to form a first calcined product. 1 part of the first calcined product is slurried in a 7.6 parts of 2% LiOH, the supernatant liquid containing the potassium salts and LiOH were decanted, the solids are reslurried in 7.6 parts of water and decanted again and then filtered or centrifuged. About 1 part of the wet centrifuged calcined product is slurried with 3 parts water and about 0.3 parts of concentrated sulfuric acid is added to the slurry, so as to adjust the pH of the slurry to about 6.0–6.2. Once the pH of the slurry has been stabilized to the above said pH range, the contents are allowed to settle, the liquid was decanted, resuspended the solids with 3 parts water, decanted the liquid and the solids are filtered or centrifuged. The solids after the pH adjustment are calcined at 800° C. for about 16 hours to provide $LiMn_2O_4$.

EXAMPLE 2

A. The permanganate reduction reaction to make amorphous $MnO_2$:

1 mole of 2-propanol, 0.75 moles of potassium hydroxide, 20 moles of water and 1.5 moles of potassium permanganate are mixed, heated to about 70° C.–80° C., and reacted in a reduction reaction of the permanganate to provide hydrous manganese dioxide. The resulting manganese dioxide is amorphous and is without a specific crystal structure.

B. The conversion of the $MnO_2$ of example 2(A) to lithiated manganese dioxide:

The manganese dioxide of example 2(A) (1 part) and 0.68 parts of $LiOH \cdot H_2O$ are blended and then calcined at about 450° C. for about 16 hours to form a first calcined product. 1 part of the first calcined product is slurried in a 7.6 parts of 2% LiOH, the supernatant liquid containing the potassium salts and LiOH were decanted, the solids are reslurried in 7.6 parts of water and decanted again and then filtered or centrifuged. About 1 part of the wet centrifuged calcined product is slurried with 3 parts water and about 0.3 parts of concentrated sulfuric acid is added to the slurry, so as to adjust the pH of the slurry to about 6.0–6.2. Once the pH of the slurry has been stabilized to the above said pH range, the contents are allowed to settle, the liquid was decanted, resuspended the solids with 3 parts water, decanted the liquid and the solids are filtered or centrifuged. The solids after the pH adjustment are calcined at 800° C. for about 16 hours to provide $LiMn_2O_4$.

EXAMPLE 3

A. The permanganate reduction reaction to make amorphous $MnO_2$:

1 mole of D-glucose, 5 moles of potassium hydroxide, 30 moles of water and 6.7 moles of potassium permanganate are mixed, heated to about 70° C.–80° C. and reacted in a reduction reaction of the permanganate to provide hydrous manganese dioxide. The resulting manganese dioxide is amorphous and is without a specific crystal structure.

B. The conversion of the $MnO_2$ of example 3(A) to lithiated manganese dioxide:

The manganese dioxide of example 3(A) (1 part) and 0.68 parts of $LiOH \cdot H_2O$ are blended and then calcined at about 450° C. for about 16 hours to form a first calcined product. 1 part of the first calcined product is slurried in a 7.6 parts of 2% LiOH, the supernatant liquid containing the potassium salts and LiOH were decanted, the solids are reslurried in 7.6 parts of water and decanted again and then filtered or centrifuged. About 1 part of the wet centrifuged calcined product is slurried with 3 parts water and about 0.3 parts of concentrated sulfuric acid is added to the slurry, so as to adjust the pH of the slurry to about 6.0–6.2. Once the pH of the slurry has been stabilized to the above said pH range, the contents are allowed to settle, the liquid was decanted, resuspended the solids with 3 parts water, decanted the liquid and the solids are filtered or centrifuged. The solids after the pH adjustment are calcined at 800° C. for about 16 hours to provide $LiMn_2O_4$.

EXAMPLE 4

A. The Permanganate Reduction to make Amorphous $MnO_2$:

One part of o-toluene sulphonamide, 1.5 parts of potassium permanganate, 0.5 parts NaOH and about 16 parts of additional water are mixed, heated to about 40° C. to about 50° C. and reacted in a reduction reaction of the permanganate to provide hydrous manganese dioxide. The resulting manganese dioxide product, collected and washed with water, is amorphous and is without a specific crystal structure.

B. The Conversion of the $MnO_2$ of Example 4(A) to Lithiated Manganese Dioxide:

The manganese dioxide of Example 4(A) (1 part) and 0.68 parts of $LiOH \cdot H_2O$ are blended and then calcined at about 450° C. for about 16 hours to form a first calcined product.

One part of the first calcined product, 7.6 parts of 2% LiOH and 7.5 parts of water are slurried, the calcined product centrifuged and the water and aqueous LiOH decanted therefrom to form a washed calcined product. About 1 part of the wet centrifuged calcined product is slurried with 3 parts water and about 0.3 parts of concentrated sulfuric acid is added to the slurry, so as to adjust the pH of the slurry to about 6.0–6.2. Once the pH of the slurry has been stabilized to the above said pH range, the contents are allowed to settle, the liquid was decanted, resuspended the solids with 3 parts water, decanted the liquid and the solids are filtered or centrifuged. The solids after the pH adjustment are calcined at 800° C. for about 16 hours to provide $LiMn_2O_4$.

EXAMPLE 5

A. The Permanganate Reduction Reaction to make Amorphous $MnO_2$:

One mole of 2,3 picoline, 2.65 moles of potassium permanganate and about 70 moles of additional water are mixed, heated to about 70° C. to about 80° C. and reacted in a reduction reaction of the permanganate to provide hydrous manganese dioxide. The resulting manganese dioxide product, collected and washed with water, is amorphous and is without a specific crystal structure.

B. The Conversion of the $MnO_2$ of Example 5(A) to Lithiated Manganese Dioxide:

The manganese dioxide of Example 5(A) (1 part) and 0.68 parts of $LiOH \cdot H_2O$ are blended and then calcined at about 450° C. for about 16 hours to form a first calcined product. One part of the first calcined product, 7.6 parts of 2% LiOH and 7.5 parts of water are slurried, the calcined product centrifuged and the water and aqueous LiOH decanted therefrom to form a washed calcined product. About 1 part of the wet centrifuged calcined product is slurried with 3 parts water and about 0.3 parts of concentrated sulfuric acid is added to the slurry, so as to adjust the pH of the slurry to about 6.0–6.2. Once the pH of the slurry has been stabilized to the above said pH range, the contents are allowed to settle, the liquid was decanted, resuspended the solids with 3 parts water, decanted the liquid and the solids are filtered or centrifuged. The solids after the pH adjustment are calcined at 800° C. for about 16 hours to provide $LiMn_2O_4$.

What is claimed is:

1. A method for making lithiated manganese oxide, the method comprising:

providing amorphous manganese dioxide which includes an alkali metal selected from the group consisting of sodium, potassium and mixtures thereof;

blending the amorphous manganese dioxide with a lithium compound to provide a lithium compound/manganese dioxide blend, the lithium compound being in molar excess of at least about 1.6 moles of lithium compound per mole of manganese dioxide;

calcining the lithium compound/manganese dioxide blend at from about 150° to about 550° C. for about 2 to about 72 hours to provide an initially calcined lithium/manganese complex;

washing the initially calcined lithium/manganese complex with aqueous lithium hydroxide to provide a washed initially calcined lithium/manganese complex, the washing being effective to provide the washed initially calcined lithium/manganese complex which when slurried with water at a ratio of about 1 part complex to about 3 parts water will result in an aqueous slurry with a pH in the range of from about 11 to about 13;

slurrying the washed initially calcined lithium/manganese complex with water to provide an aqueous slurry and adjusting the pH of the aqueous slurry of the washed lithium/manganese complex to a pH of less than about 7, the pH adjustment effective to provide a lithium/manganese complex which when calcined will provide a lithiated manganese compound having the formula $Li_xMn_2O_4$ where x is greater than 0 and less than about 2; and calcining the lithium/manganese complex from about 500° to about 900° C. for a time effective to provide the lithiated manganese compound having the formula $Li_xMn_2O_4$ where x is greater than 0 and less than about 2.

2. A method as recited in claim 1 wherein the lithium compound is lithium hydroxide.

3. A method as recited in claim 1 or 2 wherein the pH of the aqueous slurry of the washed initially calcined lithium/manganese complex is adjusted to a range of from about 6.0 to about 6.5.

4. A method as recited in claim 1 wherein x is about 1.

5. A method as recited in claim 3 wherein x is about 1.

6. A method as recited in claims 1 or 3 wherein the aqueous slurry which has its pH adjusted to less than about 7 comprises about one part washed initially calcined lithium/maganese complex and about three parts water.

7. A method for making lithiated manganese oxide, the method comprising:

chemically reducing an alkali metal permanganate or alkali metal manganate under alkaline conditions to provide an amorphous reduced manganese dioxide which includes an alkali metal selected from the group consisting of sodium, potassium and mixtures thereof;

blending the reduced manganese dioxide with a lithium compound to provide a lithium/manganese dioxide blend, the lithium compound being in molar excess of the manganese dioxide to remove the alkali metal from the reduced manganese dioxide;

calcining the lithium/manganese dioxide blend at from about 150° to about 550° C. for about 2 to about 72 hours to provide an initially calcined lithium/manganese complex;

washing the initially calcined lithium/manganese complex with aqueous lithium hydroxide to provide a washed initially calcined lithium/manganese complex, the washing being effective to provide the washed initially calcined lithium/manganese complex which when slurried with water at a ratio of about 1 part complex to about 3 parts water will result in an aqueous slurry with a pH in the range of from about 11 to about 13;

slurrying the washed initially calcined lithium/maganese complex with water to provide an aqueous slurry and adjusting the pH of the aqueous slurry of the washed lithium/maganese complex to a pH of less than about 7, the pH adjustment effective to provide a lithium/maganese complex which when calcined will provide a lithiated manganese compound having the formula $Li_xMn_2O_4$ where x is greater than 0 and less than about 2; and calcining the lithium/maganese complex from about 500° to about 900° C. for a time effective to provide the lithiated manganese compound having the formula $Li_xMn_2O_4$ where x is greater than 0 and less than about 2.

8. A method as recited in claim 7 wherein the lithium compound is lithium hydroxide.

9. A method as recited in claim 7 or 8 wherein the pH of the aqueous slurry of the washed initially calcined lithium/manganese complex is adjusted to a range of from about 6.0 to about 6.5.

10. A method as recited in claim 7 wherein x is about 1.

11. A method as recited in claim 9, wherein x is about 1.

12. A method as recited in claims 7 or 8 wherein the aqueous slurry which has its pH adjusted to less than about 7 comprises about one part washed initially calcined lithium/maganese complex and about three parts water.

13. A method for making lithiated manganese oxide, the method comprising:

chemically reducing an alkali metal permanganate selected from the group consisting of potassium permanganate, sodium permanganate and mixtures thereof under alkaline conditions to provide a permanganate reduced manganese dioxide;

blending the permanganate reduced manganese dioxide with a lithium compound to provide a lithium/manganese dioxide blend, the lithium compound being in molar excess of from about 1.6 to about 3.0 moles of lithium compound per mole of manganese dioxide;

calcining the lithium/manganese dioxide blend at from about 150° to about 550° C. for about 2 to about 72 hours to provide an initially calcined lithium/manganese complex;

washing the initially calcined lithium/manganese complex with aqueous lithium hydroxide to provide a washed initially calcined lithium/manganese complex, the washing being effective to provide the washed initially calcined lithium/manganese complex which when slurried with water at a ratio of about 1 part complex to about 3 parts water will result in an aqueous slurry with a pH in the range of from about 11 to about 13;

slurrying the washed initially calcined lithium/manganese complex with water to provide an aqueous slurry and adjusting the pH of the aqueous slurry of the washed lithium/manganese complex to a pH of less than about 7, the pH adjustment effective to provide a lithium/manganese complex which when calcined will provide a lithiated manganese compound having the formula $Li_xMn_2O_4$ where x is greater than 0 and less than about 2; and calcining the lithium/manganese complex from about 500° to about 900° C. for a time effective to provide the lithiated manganese compound having the formula $Li_xMn_2O_4$ where x is greater than 0 and less than about 2.

14. A method as recited in claim 13 wherein lithium compound is lithium hydroxide.

15. A method as recited in claims 13 or 14 wherein the pH of the aqueous slurry of the washed initially calcined lithium/manganese complex is adjusted to a ranged of from about 6.0 to about 6.5.

16. A method as recited in claim 15 where x is about 1.

17. A method as recited in claim 13 wherein x is about 1.

18. A method as recited in claim 14 wherein x is about 1.

19. A method as recited in claim 13 wherein the alkali metal permanganate is reduced with an organic reducing compound which includes side chains having from about 1 to about four carbon atoms.

20. A method as recited in claim 13 wherein the alkali metal permanganate is reduced with an organic reducing compound which has the general formula

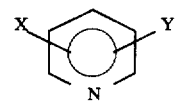

where at least one of x and y are methyl, ethyl, propyl and butyl, but one x or y may be H.

21. A method as recited in claim 14 wherein the alkali metal permanganate is reduced with an organic reducing compound which includes side chains having from about 1 to about four carbon atoms.

22. A method as recited in claim 15 wherein the alkali metal permanganate is reduced with an organic reducing compound which has the general formula

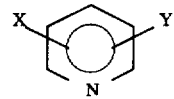

where at least one of x and y are methyl, ethyl, propyl and butyl, but one x or y may be H.

23. A method as recited in claims 13 or 17 wherein the aqueous slurry which has its pH adjusted to less than about 7 comprises about one part washed initially calcined lithium/manganese complex and about three parts water.

24. A method for making lithiated manganese oxide, the method comprising:

reducing an alkali metal permanganate selected from the group consisting of potassium permanganate and sodium permanganate with an organic reducing compound which includes side chains having from about 1 to about four carbon atoms under alkaline conditions to provide a permanganate reduced manganese dioxide;

blending the permanganate reduced manganese dioxide with a lithium compound to provide a lithium/manganese dioxide blend, the lithium compound being in molar excess of from about 1.6 to about 3.0 moles of lithiated compound per mole of manganese dioxide;

calcining the lithium/manganese dioxide blend at time and temperature such that not more than about 10 weight percent of $Li_2MnO_4$ is formed, but sodium or potassium in the blend is converted into $M_2MnO_4$ or $M_2MnO_4$ wherein M is Na or K to provide an initially calcined lithium/manganese complex;

washing the initially calcined lithium/manganese complex with aqueous lithium hydroxide to provide a washed initially calcined lithium/manganese complex, the washing being effective to provide the washed initially calcined lithium/manganese complex which when slurried with water at a ratio of about 1 part complex to about 3 parts water will result in a slurry with a pH in the range of from about 11 to about 13;

slurrying the washed initially calcined lithium/manganese complex with water to provide an aqueous slurry and adding acid to the aqueous slurry in an amount effective to provide a pH of less than about 7 and effective to provide a lithium/manganese complex which when calcined will provide a lithiated manganese compound having the formula $Li_xMn_2O_4$ where x is greater than 0 and less than about 2; and calcining the lithium/manganese complex for a time and temperature effective to provide the lithiated manganese compound having the formula $Li_xMn_2O_4$ where x is greater than 0 and less than about 2, the time and temperature also effective to provide the lithiated manganese compound with an electromotive force of from about 3 to about 4 volts when it is used as a cathodic material.

25. A method as recited in claim 24 wherein the lithium/manganese dioxide blend is calcined at from about 150° to about 550° C. for about 2 to about 72 hours and the lithium/manganese complex from about 500° to about 900° C.

26. A method as recited in claims 24 or 25 wherein a molar ratio of about two manganese atoms to about one lithium atom is provided under conditions of a pH of less than about 7.

27. A method as recited in claims 24 or 25 wherein the alkali metal permanganate is reduced with an organic reducing compound which has the general formula

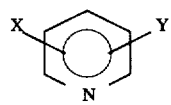

where at least one of x and y are methyl, ethyl, propyl and butyl, but one x or y may be H.

28. A method as recited in claim 24 wherein the aqueous slurry which has its pH adjusted to less than about 7 comprises about one part washed initially calcined lithium/manganese complex and about three parts water.

* * * * *